Jan. 27, 1970     R. C. SANFORD     3,491,790

DIVERTER VALVE

Filed July 18, 1966

INVENTOR
ROSS C. SANFORD,
BY Yungblut, Melville, Strasser and Foster
ATTORNEYS

United States Patent Office 3,491,790
Patented Jan. 27, 1970

1

3,491,790
DIVERTER VALVE
Ross C. Sanford, Milford, Ohio, assignor to Sanford Patent Trust, Wailuku, Maui, Hawaii
Filed July 18, 1966, Ser. No. 566,021
Int. Cl. F16k 15/04, 21/04, 31/08
U.S. Cl. 137—533.11                 4 Claims

ABSTRACT OF THE DISCLOSURE

A simple and inexpensive corrosion free diverter valve consisting of a cage-like plastic body, a valve seat defining gasket at one end of said body, and a ball valve element in said cage-like body movable from a closed position in which it is seated on the valve seat to an open position in which it is displaced from the valve seat, the cage-like body having integral means establishing the maximum distance which the ball valve element may be displaced, the ball valve element and the gasket each being formed from a material chosen from the class consisting of magnetic rubber and magnetic plastic, the maximum distance which the ball valve element may be displaced relative to the valve seat lying within the field of constant magnetic attraction between the gasket and the ball valve element.

---

This invention relates to valve structures and has to do more particularly with a diverter valve for use in conjunction with a kitchen faucet or the like wherein the faucet structure incorporates a diverter conduit for supplying water or other fluid to a spray device such as a flexible hose and spray head used to rinse dishes.

In a conventional faucet installation, it is customary to have a single outlet spout through which both hot and cold water is discharged, the water being supplied to the spout through either separate control valves for hot and cold water or through a single control dual flow valve which meters both hot and cold water as desired. In the usual installation, the diverter conduit lies on the discharge side of the flow control valve or valves, being connected to the outlet passageway leading to the discharge spout of the faucet structure. The diverter conduit is, however, of larger diameter, i.e., larger flow area, than the outlet passageway so that water flowing through the outlet passageway will seek the path of the least resistance and will be discharged through the diverter conduit as long as such conduit is open. In a conventional installation, a flexible hose or the like is connected to the diverter conduit and the free end of the hose mounts a spray head or similar attachment having a normally closed valve. When such spray head valve is opened, as where the user would be rinsing dishes or the like, the flow of water is diverted through the diverter conduit and the spray head rather than through the discharge spout of the faucet. However, there is usually a residual trickle of water through the discharge spout even though the spray head is in use; and to prevent the residual water from dripping from the discharge spout it is customary to provide a diverter valve intermediate the diverter conduit and the discharge spout. Such diverter valves are usually in the nature of a one-way valve which will be automatically opened by the normal flow of water through the outlet passageway but which, when the diverter conduit is opened to the flow of water therethrough, will close due to the loss of pressure of water impinging upon it.

While various types of diverter valves have hitherto been proposed, they have for the most part been in the form of a metallic structure comprising a cage or screen in which a ball valve, bellows, or similar spring actuated valve element is enclosed. The mass of the valve element must be such that it will be displaced under the normal pressure of the water flowing through the outlet passageway to the discharge spout, and yet it also must be sufficiently heavy or spring tensioned so that when the water pressure is reduced to a trickle, the valve will seat so as to close the outlet orifice and prevent the flow of residual water therethrough. Such valve elements have, however, presented numerous difficulties in that they are subject to corrosion and the build-up of mineral deposits which adversely affect their ability to provide a positive closure of the outlet orifice. In addition, the valves rely on gravity or on spring tension to move the valve element to the closed position, and often times the valve element will not properly seat and hence a complete and positive shut-off of residual water flow is not achieved.

In contrast to the foregoing, a principal object of the instant invention is the provision of a simple and inexpensive diverter valve which is not subject to corrosive action or the build-up of mineral deposits, and yet assures positive closure when the water pressure is materially reduced.

A further object of the instant invention is the provision of a diverter valve in which the valve parts are formed of plastic with the ball valve element itself being formed from magnetized rubber or plastic which coacts with a magnetized rubber or plastic valve seat to insure positive closure of the valve.

Still a further object of the instant invention is the provision of a diverter valve of the character described wherein the magnetized ball valve element is adapted to be unseated upon the normal flow of water therethrough, but which in the unseated position will be retained by the surrounding valve cage in a position to be attracted to the magnetized valve seat upon the loss in water pressure, as occurs where the water is diverted through a diverter conduit. Such construction, with its positive magnetic attraction, acts in a positive fashion to prevent back flow through the supply line.

Still a further object of the instant invention is the provision of a diverter valve of the character described which is extremely easy to manufacture and assemble, the valve structure being extremely compact and yet free from close manufacturing tolerances and the usual machining operations.

The foregoing, together with other objects of the invention which will appear hereinafter, or which will be apparent to the skilled worker in the art upon reading this specification, are accomplished by those constructions and arrangement of parts of which certain exemplary embodiments shall now be described.

Reference is made to the accompanying drawings wherein.

Figure 1:
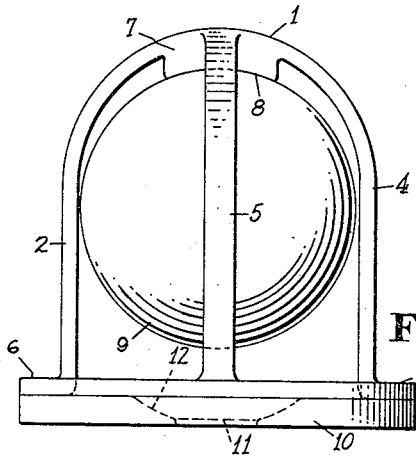
FIGURE 1 is a side elevational view of one form of diverter valve in accordance with the instant invention.
Figure 3:
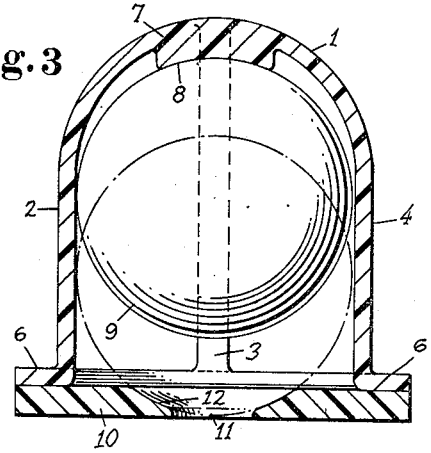
FIGURE 3 is a vertical sectional view taken along the line 3—3 of FIGURE 2.
Figure 2:
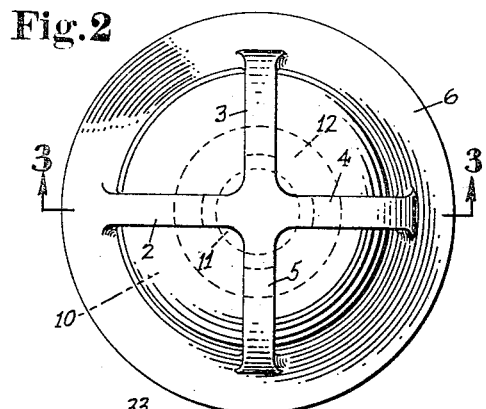
FIGURE 2 is a top plan view thereof.

Referring first to FIGURES 1 through 3 of the drawing, the diverter valve therein illustrated is of the type adapted to be fitted in the connection which joins the swivel discharge spout of a conventional kitchen faucet to the body of the faucet containing the on and off valve or valves. The diverter valve comprises a housing or cage 1 defined by a plurality of ribs 2, 3, 4 and 5 joined together at their uppermost ends to define a dome-shaped cage. At their lower most ends the ribs are joined to an annular flange 6. Preferably, the dome-shaped cage will be molded from plastic and the ribs and flange formed as an integral unit.

At the top of the dome the ribs are provided on their under or inner surfaces with integral projections or stops 7 the exposed surfaces 8 of which are preferably of curved configuration and conform to the spherical surface of the ball valve element 9 which lies within the confines of the cage.

The ball valve 9 is retained within the cage 1 by means of a gasket member 10 underlying the flange 6, the gasket member having a centrally disposed inlet orifice 11 therein surrounded by a valve seat 12, whereby the ball valve element 9 will close the orifice 11 when seated on the valve seat.

In accordance with the instant invention, both the ball valve element 9 and the gasket member 10 will be formed from magnetic rubber or magnetic plastic, the polarity of the parts being such that they will be attracted to each other. Thus, the ball valve element 9 will be normally drawn into contact with the valve seat 12 and the inlet orifice 11 closed to the flow of water therethrough. The magnitude of the magnetic attraction will, however, be such that normal water pressure flowing through the inlet orifice 11 will unseat the ball valve element 9, moving it from the position shown in dotted lines in FIGURE 3 to the position shown in solid lines. Water will thus flow through the inlet orifice 11, around the ball valve element, exiting through the spaces in the cage between the rib members 2–5. It will be understood that the discharge spout of the faucet or other outlet conduit will surround the cage 2, and hence the flow of water will be discharged through such spout or conduit. When the pressure of the water flowing through the inlet conduit 11 is materially reduced, as where the supply of water is either shut off or diverted through a diverter conduit of the type previously described, the ball valve element 9 will be effectively released from the influence of the water pressure impinging upon it and the magnetic attraction between the ball valve element and the gasket 10 will cause the ball valve element to seat and hence close the outlet orifice 11. In this connection, the dimensioning of the parts will be such that the ball valve element 9 will at all times remain within the constant magnetic field of the gasket 10 and the positive magnetic attraction affords positive back flow prevention so that contaminated water or the like cannot be siphoned into the supply line. This positive relationship of the parts may be conveniently maintained by means of the projections or stops 7 which will serve to limit the extent to which the ball valve element may be moved away from its seat.

Figure 5:
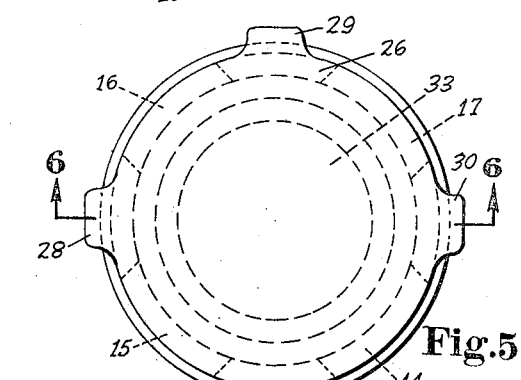
FIGURE 5 is a top plan view thereof.
Figure 4:
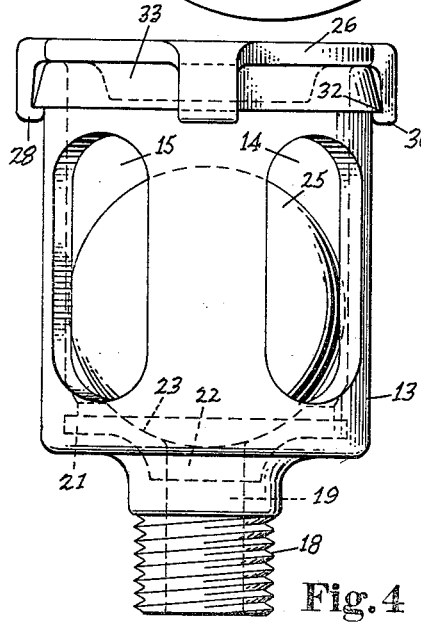
FIGURE 4 is a side elevational view of a modification of the invention.
Figure 6:
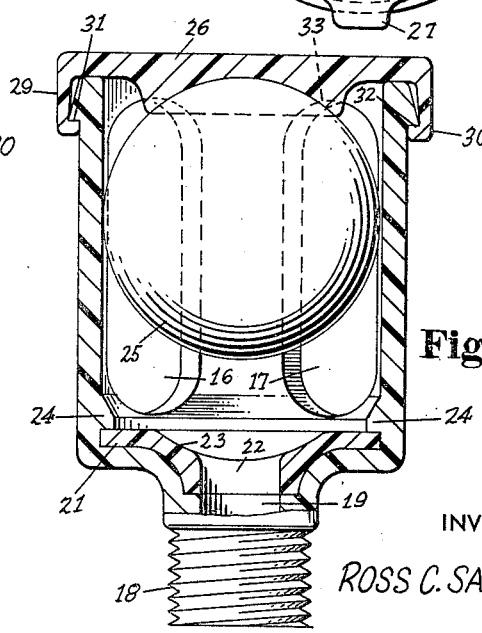
FIGURE 6 is a vertical sectional view taken along the line 6—6 of FIGURE 5.

Referring now to FIGURES 4, 5 and 6 of the drawings, there is illustrated a modification of the invention wherein the cage structure is adapted to be received in a threaded conduit forming a part of the faucet structure. In this embodiment, the cage comprises a hollow cylindrical body part 13 having a plurality of elongated openings 14, 15, 16 and 17 formed therein through which water flowing through the diverter is discharged. At one end the body part terminates in a threaded neck 18 having an inlet orifice 19 extending therethrough, the inlet orifice terminating inwardly in an annular shoulder 20 against which the gasket 21 is adapted to seat.

The gasket 21 has a centrally disposed inlet orifice 22 lying in prolongation of the orifice 19 of the neck portion; and a valve seat 23 surrounds the inlet orifice 22 in the manner illustrated. In this instance, the periphery of the gasket 21 is adapted to engage beneath annular abutment 24 formed integrally with the cylindrical body 13, thereby permitting the gasket to be snap-fitted into place.

The ball valve element 25 is inserted into the cage from the opposite end thereof, the cage having a detachable cover 26—also molded from plastic—the cover having depending locking tongues 27, 28, 29 and 30 having inturned ends adapted to enter into snap-engagement with abutments projecting outwardly from the cage, two such abutments being indicated at 31 and 32 in FIGURES 4 and 6. It will thus be evident that the ball valve element 25 may be inserted in the cage, whereupon the cover 26 will be placed over the end of the cage and snap-locked to the valve body. Such construction not only facilitates the assembly of the device but additionally makes its extremely simple to replace the ball valve element or the gasket should replacement be required.

The cover 26 is provided on its inner surface with a ball seat 33 which is contacted by the ball valve element when lifted from the valve seat under the pressure of the water flowing through the inlet orifices 19 and 22. As in the case of the stops 7 of the earlier embodiment of the invention, the ball seat 33 will act to maintain the ball valve element within the field of magnetic attraction of the gasket 21 so that the ball valve element will be drawn to the valve seat at any time the flow of water through the valve is effectively shut off.

Both magnetic rubbers and magnetic plastics are known to the art and may be compounded in diverse ways. Generally speaking, where magnetic rubber is employed— which is preferred—the material will comprise an oil resistant thermosetting elastomer which incorporates a high percentage of finely divided chemical particles capable of being parmanently magnetized. Where magnetized plastic is employed, the chemical particles may be dispersed in an elastomeric or rigid plastic material, such as a theromplastic vinyl resin.

Modifications may be made in the invention without departing from its spirit and purpose, and consequently it is not intended that the invention be limited in any manner excepting as set forth in the claims which follow.

The embodiments of the invention in which an exclusive property or privilege is claimed are defined as follows:

1. A diverter valve for preventing the flow of fluid until the pressure of said fluid has reached a predetermined level, said valve comprising a cage-like plastic body having an inlet opening for said fluid at one end thereof, a stop means at the other end thereof, a plurality of outlet openings for said fluid intermediate said ends, an annular gasket adjacent said inlet end of said body and surrounding said inlet opening, a valve seat on said gasket facing said stop means, a ball valve element within said cage-like body, said ball valve element being movable within said body from a closed position wherein it is seated on said valve seat to an open position wherein it is displaced from said valve seat, said end of said cage-like body having said stop means being dome-shaped, said inlet end having an annular flange the inner diameter of which is greater than the diameter of said ball valve element, said gasket being seated against said annular flange, said ball valve element and said gasket each being formed from a material chosen from the class consisting of magnetic rubber and magnetic plastic, the polarity of said ball valve element and said gasket being such that said ball valve element will be attracted to said gasket means, the magnitude of said magnetic attraction being such as to hold said ball valve element in seated position against said valve seat until said predetermined fluid pressure is reached, whereupon said valve element will be displaced from said valve seat, said stop means being spaced from said valve seat by a distance such that said ball valve element will at all times remain within the constant magnetic field of said gasket and being positively attracted thereto.

2. The diverter valve claimed in claim 1 wherein said dome-shaped body comprises a plurality of ribs projecting upwardly from said flange, said ribs converging inwardly and meeting centrally to define said dome-shaped end of said cage-like body, and wherein said stop means comprises a projection extending inwardly within said cage from the said dome-shaped end thereof.

3. A diverter valve for preventing the flow of fluid until the pressure of said fluid has reached a predetermined level, said valve comprising a cage-like plastic body having an inlet opening for said fluid at one end thereof, a stop means at the other end thereof, a plurality of outlet openings for said fluid intermediate said ends, an annular gasket adjacent said inlet end of said body and surrounding said inlet opening, a valve seat on said gasket facing said stop means, a ball valve element within said cage-like body, said ball valve element being movable within said body from a closed position wherein it is seated on said valve seat to an open position wherein it is displaced from said valve seat, said cage-like body being of hollow cylindrical configuration having said plurality of outlet openings in the cylindrical surface thereof, said body terminating at one end in a neck portion having said inlet opening extending therethrough, said gasket being juxtaposed to the inner surface of said neck portion with an inlet orifice therein in alignment with said inlet opening in said neck portion, abutment means projecting inwardly from the inner surface of said cylindrical body, the periphery of said gasket being engageable beneath said abutment means to detachably secure said gasket in place, a cover member closing the end of said body opposite said end having said neck portion, said stop means being located on the inner surface of said cover member, said ball valve element and said gasket each being formed from a material chosen from the class consisting of magnetic rubber and magnetic plastic, the polarity of said ball valve element and said gasket being such that said ball valve element will be attracted to said gasket means, the magnitude of said magnetic attraction being such as to hold said ball valve element in seated position against said valve seat until said predetermined fluid pressure is reached, whereupon said valve element will be displaced from said valve seat, said stop means being spaced from said valve seat by a distance such that said ball valve element will at all times remain within the constant magnetic field of said gasket and being positively attracted thereto.

4. The diverter valve claimed in claim 3 wherein said cover includes attachment means for detachably connecting said cover to said cylindrical body.

References Cited
UNITED STATES PATENTS

| | | | |
|---|---|---|---|
| 780,786 | 1/1905 | Dunham | 137—533.13 |
| 2,476,434 | 7/1949 | Spang | 137—533.11 XR |
| 2,646,071 | 7/1953 | Wagner | 251—65 XR |
| 2,937,659 | 5/1960 | Harris | 137—533.13 |
| 2,949,931 | 8/1960 | Ruppright | 137—533.19 XR |
| 2,994,340 | 8/1961 | Biello | 137—516.29 |
| 3,059,667 | 10/1962 | Coceano | 137—533.13 |
| 3,189,675 | 6/1965 | Moore | 251—65 XR |
| 3,279,487 | 10/1966 | Elam | 251—65 XR |

HAROLD W. WEAKLEY, Primary Examiner

U.S. Cl. X.R.

137—533.15, 533.19; 251—65